UNITED STATES PATENT OFFICE.

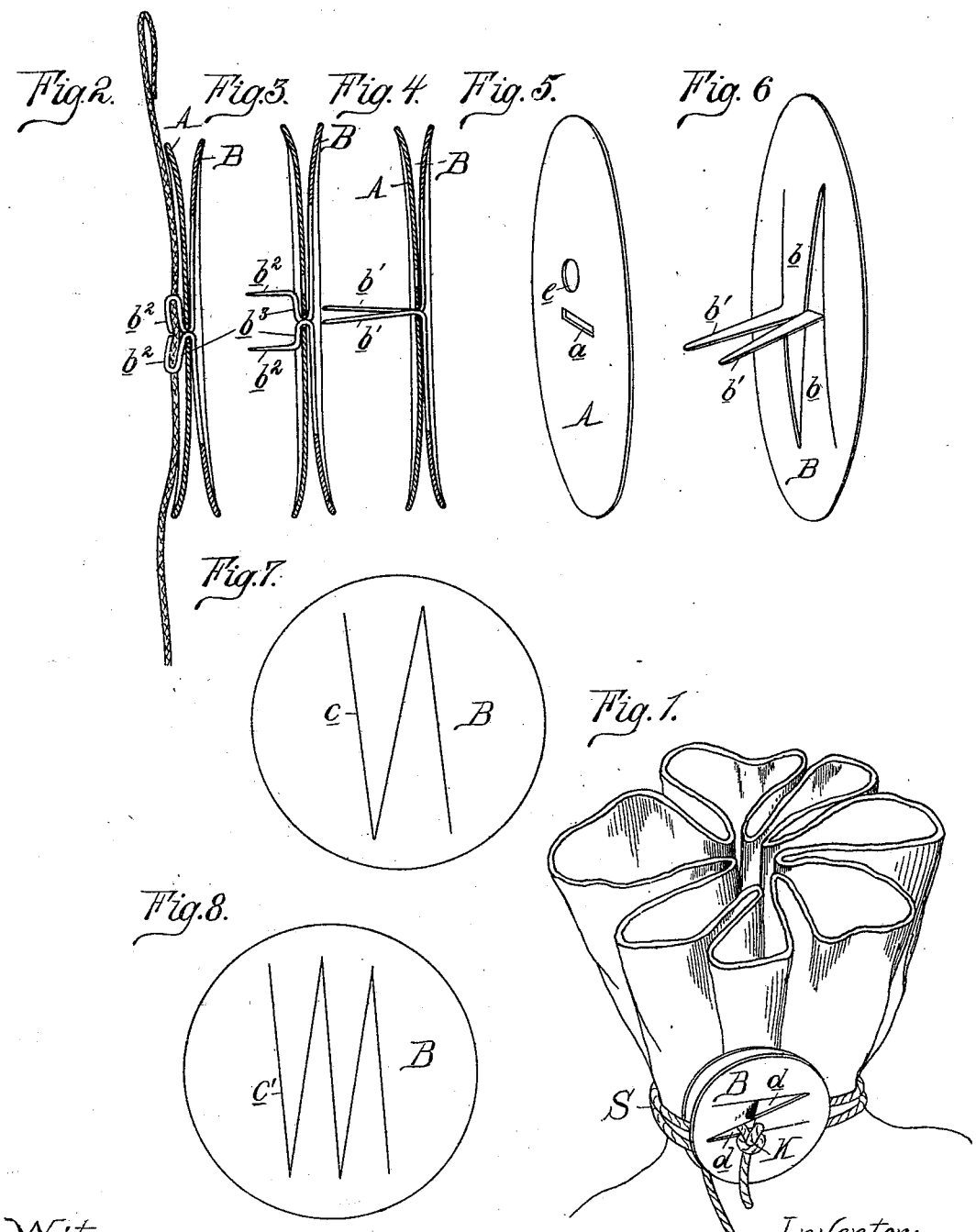

JOHN H. KIRKLAND, OF COMBER, CANADA.

BAG-FASTENER.

SPECIFICATION forming part of Letters Patent No. 646,602, dated April 3, 1900.

Application filed August 10, 1899. Serial No. 726,740. (No model.)

*To all whom it may concern:*

Be it known that I, JOHN H. KIRKLAND, a citizen of Canada, residing at Comber, in the county of Essex and Province of Ontario, Canada, have invented certain new and useful Improvements in Bag-Fasteners, of which the following is a specification, reference being had therein to the accompanying drawings.

This invention relates more specifically to that class of fasteners in which the usual cord is used as a tie, and has for its object to secure the cord without tying the ends; and the invention consists in the peculiar construction, arrangement, and operation of two clamping-disks whereby the same are integrally provided with means for fastening the same to a bag and are held together by a spring tension for holding the end of the tying-cord, all as more fully hereinafter described, and shown in the accompanying drawings, in which—

Figure 1 is a perspective view of the bag-fastener as in use. Fig. 2 is a vertical section of the clamping-disks attached to a bag. Fig. 3 is a like section before attaching to the bag. Fig. 4 is a vertical section showing the clamping-disk in an uncompleted stage. Figs. 5 and 6 are perspective views of the two clamping-disks before joining them. Fig. 7 is an elevation of one of the clamping-disks in its earliest stage of manufacture. Fig. 8 is a modification of Fig. 7.

My bag-fastener is composed of two disks A B, preferably stamped from a thin sheet of spring metal and are given a slightly-dished form, so that when the disks are joined, as shown in Figs. 1, 2, 3, and 4, the edges are sprung apart. The disk A is formed centrally with a slot $a$, and the disk B is formed with pointed spring-tongues $b$ $b$, made by cutting the material of the disk on the line $c$. (Indicated in Fig. 7.) The tongues thus separated are first partially bent up at right angles, so as to form the projecting spurs $b'$ $b'$, as shown in Fig. 6. The disk thus constructed is joined to the disk A by passing the spurs $b'$ $b'$ first through the slot $a$ of the disk A, as shown in Fig. 4, and then partially bending them down, as shown in Fig. 3, leaving the sharp spurs $b^2$ still projecting, while the bent-over portions $b^3$ $b^3$ hold the two disks firmly together, the slot $a$ being made just of a size to admit the spurs $b'$ $b'$. The disks being thus joined, the device can be readily attached to the bag by means of the sharp spurs $b^2$ $b^2$, as shown in Fig. 2.

The string or cord S for tying the bag may be permanently secured with one end to the device by making a knot K in one end and passing it through one of the openings $d$ formed in the disk B by the cutting out of the spurs $b$. I also preferably form a hole $e$ in the disk A, which registers with one of the openings $d$, so that the string may be passed through both disks, the knot preventing it from being drawn through entirely.

Instead of forming the disk B only with two spring-tongues more may be provided, and Fig. 8 illustrates how it may be made with four tongues by cutting the disk along the lines $c'$. The four tongues thus formed may be bent up and the disks secured together the same as before described and thus make four spurs for fastening the device to the bag.

The tying of the bag is accomplished by passing the cord once or more around the bag and securing the loose end by drawing it between the two disks, all in the usual manner, and it will be seen that with my construction the two disks are connected by a spring tension derived from the portion of the tongues $b$ remaining in the plane of the disk B.

My device has the advantage of simplicity and cheapness of construction and secures the cord against any liability of becoming accidentally untied, which is frequently the case with disks rigidly secured together and which has always made the use of such devices hazardous.

It is obvious that instead of securing the two disks together by bending over the spurs any equivalent mode of fastening may be used. Thus the spurs may be only slightly twisted or nicked at the base after passing them through the slot $a$.

While I have described my invention as a "bag-fastener," I do not intend to limit myself to such use alone, as it is obvious that it is adapted to fasten all kinds of packages to which such devices may be applied.

What I claim as my invention is—

1. As a new article of manufacture, a bag-fastener composed of two concavo-convex metal disks united to each other independently of the bag by spring-tongues integrally formed with one of the disks and constituting a spring-tension device elastically holding the disks together free to separate under tension.

2. In a bag-fastener, the combination of the disk A formed with a slot $a$ and the disk B having tongues $b$ integrally formed with the disk and overlapping each other in the center of the disk, said overlapping portion engaging into the slot $a$ and forming the means for securing the disks together independently of the bag and project outwardly to form spurs for fastening to the bag.

3. In a bag-fastener, the combination of the disk A formed with the slot $a$ and the disk B formed with spring-tongues $b$, said tongues engaging into the slot $a$ and having the bent-over portions $b^3$ and spurs $b^2$.

In testimony whereof I affix my signature in presence of two witnesses.

JOHN H. KIRKLAND.

Witnesses:
OTTO F. BARTHEL,
V. D. KINNER,